United States Patent
Takahashi et al.

(10) Patent No.: US 9,902,897 B2
(45) Date of Patent: Feb. 27, 2018

(54) DEGRADABLE FIBER FOR USE IN WELL TREATMENT FLUID, METHOD FOR MANUFACTURING SAME, AND WELL TREATMENT METHOD

(71) Applicant: Kureha Corporation, Tokyo (JP)

(72) Inventors: Takeo Takahashi, Tokyo (JP); Hikaru Saijo, Tokyo (JP); Mizuki Saito, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 14/894,635

(22) PCT Filed: May 30, 2014

(86) PCT No.: PCT/JP2014/064456
§ 371 (c)(1),
(2) Date: Nov. 30, 2015

(87) PCT Pub. No.: WO2014/196474
PCT Pub. Date: Dec. 11, 2014

(65) Prior Publication Data
US 2016/0102244 A1    Apr. 14, 2016

(30) Foreign Application Priority Data
Jun. 3, 2013 (JP) ................. 2013-116712

(51) Int. Cl.
| | |
|---|---|
| *C09K 8/80* | (2006.01) |
| *D01F 6/62* | (2006.01) |
| *D01F 6/92* | (2006.01) |
| *D01F 8/14* | (2006.01) |
| *E21B 43/26* | (2006.01) |
| *C09K 8/035* | (2006.01) |
| *C08G 63/08* | (2006.01) |
| *C08G 63/16* | (2006.01) |
| *C08L 67/04* | (2006.01) |
| *D01D 5/34* | (2006.01) |

(52) U.S. Cl.
CPC ............. *C09K 8/80* (2013.01); *C08G 63/08* (2013.01); *C08G 63/16* (2013.01); *C08L 67/04* (2013.01); *C09K 8/035* (2013.01); *D01F 6/62* (2013.01); *D01F 6/625* (2013.01); *D01F 6/92* (2013.01); *D01F 8/14* (2013.01); *E21B 43/26* (2013.01); *C08L 2205/025* (2013.01); *C09K 2208/08* (2013.01); *D01D 5/34* (2013.01); *D10B 2331/04* (2013.01); *D10B 2331/041* (2013.01); *D10B 2401/00* (2013.01); *D10B 2505/00* (2013.01)

(58) Field of Classification Search
None
See application file for complete search history.

(56) References Cited

U.S. PATENT DOCUMENTS

| | | | |
|---|---|---|---|
| 6,849,582 B2 | 2/2005 | Grainger et al. | |
| 7,380,601 B2 | 6/2008 | Willberg et al. | |
| 7,445,841 B1* | 11/2008 | Kaijiyama | C08G 63/06 264/172.17 |
| 7,581,590 B2 | 9/2009 | Lesko et al. | |
| 7,833,950 B2 | 11/2010 | Willberg et al. | |
| 2007/0289743 A1* | 12/2007 | Willberg | C09K 8/68 166/280.2 |
| 2008/0236823 A1 | 10/2008 | Willberg et al. | |
| 2011/0165370 A1 | 7/2011 | Kimura et al. | |
| 2012/0130024 A1 | 5/2012 | Sato et al. | |
| 2013/0252854 A1 | 9/2013 | Abe et al. | |

FOREIGN PATENT DOCUMENTS

| | | | |
|---|---|---|---|
| CN | 102471943 A | | 5/2012 |
| JP | 2003533619 A | | 11/2003 |
| JP | 2011-157661 | * | 8/2011 |
| JP | 2012251277 A | | 12/2012 |
| WO | WO2011016321 A1 | | 2/2011 |
| WO | WO2012050187 A1 | | 4/2012 |
| WO | WO2012082517 A1 | | 6/2012 |
| WO | WO2012082521 A1 | | 6/2012 |

OTHER PUBLICATIONS

Takafumi et al, Aug. 2011, machine translation of JP patent.*
International Search Report of PCT/JP2014/064456 dated Sep. 2, 2014.
International Preliminary Report on Patentability Chapter I for International Application No. PCT/JP2014/064456.
Notification of First Office Action dated May 5, 2016, in Chinese Patent Application No. 201480024874.9, with English translation.
Extended European Search Report dated Apr. 4, 2017, in European Patent Application No. 14808150.8.

* cited by examiner

*Primary Examiner* — Jeffrey Washville
(74) *Attorney, Agent, or Firm* — Birch, Stewart, Kolasch & Birch, LLP

(57) ABSTRACT

A fiber formed from a resin that degrades in treatment fluid for hydrocarbon resource recovery, an oligomer component content of a resin forming an outer surface of the fiber being not greater than 1 mass %, and a birefringence of the fiber being not less than 0.02; a method for manufacturing a degradable fiber for use in well treatment fluid, the oligomer component content of a resin that forms an outer surface of an undrawn yarn obtained in a spinning step being not greater than 1 mass %, and a birefringence of a drawn yarn before heat treatment in a drawing step being not less than 0.02; and a well treatment method using the well treatment fluid containing the degradable fiber for use in well treatment fluid and a proppant.

11 Claims, No Drawings

DEGRADABLE FIBER FOR USE IN WELL TREATMENT FLUID, METHOD FOR MANUFACTURING SAME, AND WELL TREATMENT METHOD

TECHNICAL FIELD

The present invention relates to a degradable fiber for use in well treatment fluid used for producing a hydrocarbon resource such as petroleum or natural gas, a method for manufacturing the same, and a well treatment method that uses the fiber.

BACKGROUND ART

Hydrocarbon resources such as petroleum or natural gas has come to be produced by excavation through wells (oil wells or gas wells, also collectively called "wells") having a porous and permeable subterranean formation. As energy consumption increases, deeper wells are being drilled, reaching depths greater than 9000 m worldwide and greater than 6000 m in Japan. In wells that are continuously excavated, the productive zone is stimulated in order to continuously excavate hydrocarbon resources efficiently from subterranean formations of which permeability has decreased over time or subterranean formations of which permeability has gradually become insufficient. Acid treatment and fracturing are known as stimulation methods (Patent Document 1). Acid treatment is a method in which the permeability of the productive zone is increased by injecting a mixture of strong acids such as hydrochloric acid and hydrogen fluoride into the productive zone and dissolving the reaction components of bedrock (carbonates, clay minerals, silicates, and the like). However, various problems that accompany the use of strong acids have been identified, and increased costs, including various countermeasures, have also been pointed out. Thus, a method for forming a fracture in the productive zone using fluid pressure ("fracturing" or "hydraulic fracturing") has received attention.

Hydraulic fracturing is a method in which a fracture is generated in the productive zone by fluid pressure such as water pressure (also simply called "hydraulic pressure" hereinafter). Generally, a vertical borehole is drilled, and then, the vertical borehole is curved and a horizontal borehole is drilled in a subterranean formation of several thousand meters underground. Fracturing fluid is then fed into the well at high pressure, and a fracture is produced by the hydraulic pressure in the deep subterranean productive zone (layer that produces the hydrocarbon resource such as petroleum or natural gas), and the productive zone is thereby stimulated to extract the hydrocarbon resource through the fracture. The efficacy of hydraulic fracturing has also been expected for the development of unconventional resources such as shale oil (oil that matures in shale) and shale gas.

A fracture formed by fluid pressure such as water pressure immediately closes due to formation pressure when the hydraulic pressure is no longer applied. To prevent a fracture closure, a proppant is included in the fracturing fluid (that is, the well treatment fluid used in fracturing), which is fed into the well, thereby placing the proppant in the fracture. Inorganic or organic materials are used as proppants included in fracturing fluid, but silica, alumina, and other inorganic particles have been conventionally used, and sand particles such as 20/40-mesh have been widely used because they are capable of preventing fracture closure in a high-depth subterranean environment under high temperature and high pressure over as long a period as possible.

To excavate (produce) a hydrocarbon resource from a productive zone, it is necessary that the gap which hydrocarbon resources can pass is formed by the proppant which are arranged to prevent closure of the fracture, as a result, permeability is secured. Permeability of gaps by the proppant is required in order to greatly affect the production efficiency of excavation of the hydrocarbon resource from the productive zone.

Various types of water-based, oil-based, and emulsion-based fluid are used as well treatment fluids such as fracturing fluid. Because the well treatment fluid must have the function of transporting the proppant to the location where the fracture is generated in the well, it generally must have a prescribed viscosity, good proppant dispersibility, ease of after-treatment, and low environmental load. Therefore, in addition to the proppant, various additives are used in the well treatment fluid, such as gelling agents, antiscale agents, acids for dissolving rock and the like, friction-reducing agents, and the like. For example, a composition comprising approximately from 90 to 95 mass % of water, approximately from 5 to 9 mass % of 20/40-mesh sand (proppant) and approximately from 0.5 to 1 mass % of additives may be used as the fluid composition for performing fracturing.

The idea of blending a degradable material into well treatment fluids is known from the perspectives of ease of after-treatment of the well treatment fluid and reduction of the environmental load thereof. For example, Patent Document 2 discloses that solid particles comprising degradable materials are included in a fracturing fluid, and examples of the shape of the solid particles comprising the degradable materials include spheres, rods, sheets, ribbons, fibers, and the like. Examples of fibers also include resin fibers, together with glass, ceramics, carbon, metals, and alloys.

Patent Documents 3 and 4 disclose slurry-like well treatment fluids containing degradable fiber and a proppant in a viscous carrier fluid, and well treatment methods for injecting these slurries. Patent Documents 3 and 4 also describe, as degradable fibers, fibers comprising polymers or copolymers of lactic acid or glycolic acid, or copolymers of lactic acid or glycolic acid with other hydroxy or carboxylic acid or hydroxycarboxylic acid containing components, and specifically, degradable fibers having fineness of 0.1 to 20 denier and fiber length of 2 to 25 mm.

The degradable fibers disclosed in Patent Documents 3 and 4 can prevent settling of the proppant in a viscous carrier fluid while the well treatment fluid containing the proppant is being transported to the location where well stimulation such as fracturing is performed, and furthermore, it is degraded and removed after well stimulation such as fracturing has been performed. However, as the distance for which the well treatment fluid is transported increases (that is, as the productive zone becomes deeper), the settlement inhibiting effect on the proppant contained in the well treatment fluid must be further improved.

Based on increased demand for securement of energy resources and environmental protection, particularly as excavation of unconventional resources expands, excavation conditions are becoming increasingly harsh. Thus, as a degradable fiber for use in well treatment fluid contained in well treatment fluids such as fracturing fluid, cementing fluid, temporary plug fluid, and completion fluid, there has come to be a demand for a degradable fiber that has an excellent settlement inhibiting effect on the proppant in the well treatment fluid and that also improves the well stimulation effect of fracturing or the like due to being hydrolyzable or biodegradable.

CITATION LIST

Patent Literature

Patent Document 1: Japanese Unexamined Patent Application Publication (Translation of PCT Application) No. 2003-533619 (corresponding to U.S. Pat. No. 6,849,582 specification)
Patent Document 2: U.S. Pat. No. 7,581,590 Specification
Patent Document 3: U.S. Pat. No. 7,833,950 Specification
Patent Document 4: U.S. Pat. No. 7,380,601 Specification

SUMMARY OF INVENTION

Technical Problem

A first aspect of the problem of the present invention is to provide a degradable fiber for use in well treatment fluid that has an excellent settlement inhibiting effect on the proppant in the well treatment fluid and that also improves the well stimulation effect of fracturing or the like due to being hydrolyzable or biodegradable. Another aspect of the problem of the present invention is to provide a method for manufacturing the degradable fiber for use in well treatment fluid, and to provide a well treatment method that uses well treatment fluid containing the degradable fiber for use in well treatment fluid.

Solution to Problem

As a result of diligent research to solve the above problems, the present inventors discovered that the proppant settlement inhibiting effect depends on the dispersibility of the degradable fiber for well treatment fluid in the well treatment fluid. Thus, as a result of further research on the improvement of dispersibility of the degradable fiber for well treatment fluid in well treatment fluid, the present inventors discovered that the problem of improving dispersibility of degradable fiber can be solved by a fiber having a characteristic content of oligomer components in the resin that forms the outer surface of the fiber and a characteristic birefringence thereof, and thereby achieved the present invention.

Specifically, according to a first aspect of the present invention, (1) below:
(1) A degradable fiber for use in well treatment fluid, which is formed from a resin that degrades in a treatment fluid for hydrocarbon resource recovery,
an oligomer component content of a resin forming an outer surface of the fiber being not greater than 1 mass %, and a birefringence of the fiber being not less than 0.02 is provided.

Further, as specific embodiments of the first aspect of the present invention, the degradable fibers for use in well treatment fluid, (2) to (5) below:
(2) The degradable fiber for use in well treatment fluid according to (1) above, wherein the fiber is dispersed in a single-fiber state in a treatment fluid for hydrocarbon resource recovery;
(3) The degradable fiber for use in well treatment fluid according to (1) or (2) above, wherein a fineness is from 0.1 to 20 de, and a fiber length is from 0.3 to 100 mm;
(4) The degradable fiber for use in well treatment fluid according to any one of (1) to (3) above, wherein the fiber is a composite fiber;
(5) The degradable fiber for use in well treatment fluid according to any one of (1) to (4) above, wherein the resin that degrades in a treatment fluid for hydrocarbon resource recovery contains an aliphatic polyester are provided.

Furthermore, according to another aspect of the present invention, (A) below:
(A) A method for manufacturing a degradable fiber for use in well treatment fluid, which is described in any one of (1) to (5) above in which the fiber is formed from a resin that degrades in treatment fluid for hydrocarbon resource recovery, an oligomer component content of a resin forming an outer surface of the fiber is not greater than 1 mass %, and a birefringence of the fiber is not less than 0.02, comprising a spinning step and a drawing step, the oligomer content of a resin that forms an outer surface of an undrawn yarn obtained in the spinning step being not greater than 1 mass %, and a birefringence of a drawn yarn before heat treatment in the drawing step being not less than 0.02 is provided.

Furthermore, according to still another aspect of the present invention, (I) below:
(I) A well treatment method using a well treatment fluid, which contains a degradable fiber for use in well treatment fluid and a proppant, the fiber being formed from a resin that degrades in treatment fluid for hydrocarbon resource recovery, an oligomer component content of a resin forming an outer surface of the fiber being not greater than 1 mass %, and a birefringence of the fiber being not less than 0.02 is provided.

As specific embodiments of the other aspects of the present invention, the well treatment methods (II) to (V) below:
(II) The well treatment method according to (I) above, using a well treatment fluid containing a degradable fiber for use in well treatment fluid and a proppant, the degradable fiber for use in well treatment fluid being dispersed in a single-fiber state in a treatment fluid for hydrocarbon resource recovery;
(III) The well treatment method according to (I) or (II) above, using a well treatment fluid containing a degradable fiber for use in well treatment fluid and a proppant, the degradable fiber for use in well treatment fluid having a fineness of 0.1 to 20 denier and a fiber length of 0.3 to 100 mm;
(IV) The well treatment method according to any one of (I) to (III) above, using a well treatment fluid containing a degradable fiber for use in well treatment fluid and a proppant, the degradable fiber for use in well treatment fluid being a composite fiber;
(V) The well treatment method according to any one of (I) to (IV) above, using a well treatment fluid containing a degradable fiber for use in well treatment fluid and a proppant, the resin that degrades in a treatment fluid for hydrocarbon resource recovery containing an aliphatic polyester are provided.

Advantageous Effects of Invention

The first aspect of the present invention demonstrates the effect of providing a degradable fiber for use in well treatment fluid, which, due to being a degradable fiber for use in well treatment fluid formed from a resin that degrades in a treatment fluid for hydrocarbon resource recovery wherein an oligomer component content of a resin forming an outer surface of the fiber is not greater than 1 mass % and a birefringence of the fiber is not less than 0.02, has an excellent proppant settlement inhibiting effect, and, due to having excellent hydrolyzability and biodegradability, can improve the well stimulation effect of fracturing or the like.

Furthermore, another aspect of the present invention demonstrates the effect of providing a method for manufacturing the aforementioned degradable fiber for use in well treatment fluid, comprising a spinning step and a drawing step, which can easily manufacture a degradable fiber for use in well treatment fluid which, due to the oligomer content of a resin that forms an outer surface of an undrawn yarn obtained in the spinning step being not greater than 1 mass % and due to a birefringence of a drawn yarn before heat treatment in the drawing step being not less than 0.02, has an excellent proppant settlement inhibiting effect, and, due to having excellent hydrolyzability and biodegradability, can improve the well stimulation effect of fracturing or the like.

Furthermore, yet another aspect of the present invention demonstrates the effect of providing a well treatment method using a well treatment fluid containing the aforementioned degradable fiber for use in well treatment fluid and a proppant, in which the proppant in a viscous carrier fluid is prevented from settling while the well treatment fluid containing the proppant is being transported to the location where well stimulation such as fracturing is performed, and after well stimulation such as fracturing, the degradable fiber is degraded and removed.

DESCRIPTION OF EMBODIMENTS

The present invention relates to a degradable fiber for use in well treatment fluid, formed from a resin that degrades in treatment fluid for hydrocarbon resource recovery, an oligomer component content of a resin forming an outer surface of the fiber being not greater than 1 mass %, and a birefringence of the fiber being not less than 0.02.

I. Well Treatment Fluid

The well treatment fluid including the degradable fiber for use in well treatment fluid of the present invention encompasses fluids for excavation and production of hydrocarbon resources such as petroleum and natural gas, by passing through a well (borehole) having a porous and permeable subterranean formation, and specifically includes drilling fluids, fracturing fluids, cementing fluids, temporary plug fluids, completion fluids, and the like.

1. Composition of Well Treatment Fluid

In the present invention, the well treatment fluid contains the degradable fiber for use in well treatment fluid of the present invention, a treatment fluid for hydrocarbon resource recovery, a proppant, and additives.

Fluid

In the well treatment fluid including the degradable fiber for use in well treatment fluid of the present invention, the treatment fluid for hydrocarbon resource recovery serving as the dispersion medium of the degradable fiber for use in well treatment fluid, the proppant, and the like (also simply called "fluid" hereinafter) is not particularly limited as long as it is a fluid that can demonstrate the function corresponding to the type of well treatment fluid, such as, for example in the case of a fracturing fluid, generating a fracture in the productive zone, and that can disperse the degradable fiber in the fluid. Water is preferably used because it is not dangerous or toxic, it is easy to handle, it has no unexpected reactions and actions against proppants and the like contained in the fluid, and it is inexpensive to procure.

Proppant

The proppant that can also be contained in the well treatment fluid including the degradable fiber for use in well treatment fluid of the present invention is not particularly limited as long as it can, for example in the case of a fracturing fluid, resist deep subterranean formation pressure during the production of a hydrocarbon resource and maintain a fracture formed by injected fluid pressure. Materials used as materials for conventional proppants may be used, and inorganic or organic materials may be used. Organic materials that may be used include plastic beads made of styrene-divinylbenzene copolymer or the like, nutshells, or shells. Examples of inorganic materials that may be used include inorganic particles of metal, silica, alumina, or the like. From the perspectives of transportability, ease of handling, strength, and economy, sand, gravel, glass beads, ceramics, bauxite, glass, and the like, or combinations thereof, are preferred. The shape and size of the proppant are not particularly limited, but from the perspectives of ease of handling, transportability, and strength, the preferred shape is spherical particles or pellet-form, and the preferred size is a diameter or length of from 0.02 mm (20 µm) to 8 mm, more preferably from 0.03 mm (30 µm) to 7 mm, and even more preferably approximately from 0.04 mm (40 µm) to 6 mm. As a proppant, preferably as a proppant made of inorganic particles, a proppant that is covered with an adhesive component may be used or a fibrous substance (fiber) that is adhesive may be used in combination because they can form stable proppant clusters (also called "cluster post") in the productive zone, specifically in the fracture. As the proppant included in a fracturing fluid, one type of proppant may be used, but two or more types of proppant of different materials, shapes, and sizes may also be used. The content of the proppant in the well treatment fluid is not particularly limited, but is, for example, approximately from 10 to 1000 g/L, preferably from 20 to 900 g/L, and more preferably from 30 to 800 g/L.

Additives

In the well treatment fluid including the degradable fiber for use in well treatment fluid of the present invention, various additives such as gelling agents, antiscale agents, acids for dissolving rock and the like, friction-reducing agents, and the like may be used in addition to the proppant. The content of these additives in the well treatment fluid is not particularly limited, and is adjusted as appropriate according to the state of the well and the like.

2. Degradable Fiber for Use in Well Treatment Fluid

The degradable fiber for use in well treatment fluid of the present invention is a fiber containing a resin that degrades in treatment fluid for hydrocarbon resource recovery (also called "degradable resin" hereinafter). Due to the degradable fiber being included together with a proppant in a well treatment fluid, the dispersibility of the proppant in the fluid is improved, and as a result, the proppant settlement inhibiting effect in the well treatment fluid is excellent.

(1) Degradable Fiber

The degradable fiber for use in well treatment fluid of the present invention is a degradable fiber containing a degradable resin which is, for example, biodegradable, meaning that it is degraded by microorganisms in the soil in which the well treatment fluid is used, or water-soluble, meaning that it dissolves in water in the well treatment fluid, or hydrolyzable, meaning that it is degraded by water as well as by acids or alkalis if desired, but it may also be a fiber for use in well treatment fluid that can be degraded by another method. Preferably, it is a hydrolyzable fiber degraded by water of not less than a prescribed temperature. An example is a fiber which has degraded and does not retain a fiber shape after 1 g of the fiber is soaked for 12 hours in a sufficient amount of 90° C. boiling water.

Examples of degradable fibers include fibers containing aliphatic polyesters such as polylactic acid, polyglycolic acid, and polycaprolactone, or polyvinyl alcohols or the like as the degradable resin. The degradable resin may be one type alone or a combination obtained by blending two or more types.

Aliphatic Polyester Fiber

The aliphatic polyester fiber formed from an aliphatic polyester is a fiber formed from an aliphatic polyester obtained by, for example, homopolymerization or copolymerization of an oxycarboxylic acid and/or a lactone, an esterification reaction of an aliphatic dicarboxylic acid and an aliphatic diol, or copolymerization of an aliphatic dicarboxylic acid, an aliphatic diol, and an oxycarboxylic acid and/or a lactone, and dissolves in water or another solvent at a temperature of, for example, 20 to 250° C.

Examples of the oxycarboxylic acid include aliphatic hydroxycarboxylic acids having from 2 to 8 carbons, such as glycolic acid, lactic acid, malic acid, hydroxypropionic acid, hydroxybutyric acid, hydroxypentanoic acid, hydroxycaproic acid, hydroxyheptanoic acid, hydroxyoctanoic acid, and the like.

Example of the lactone include lactones having from 3 to 10 carbons, such as propiolactone, butyrolactone, valerolactone, caprolactone, and the like.

Examples of the aliphatic dicarboxylic acid include aliphatic saturated dicarboxylic acids having from 2 to 8 carbons such as oxalic acid, malonic acid, succinic acid, glutaric acid, and adipic acid, aliphatic unsaturated dicarboxylic acids having from 4 to 8 carbons such as maleic acid and fumaric acid, and the like.

Examples of the aliphatic diol include alkylene glycols having from 2 to 6 carbons such as ethylene glycol, propylene glycol, butanediol, and hexanediol, polyalkylene glycols having from 2 to 4 carbons such as polyethylene glycol, polypropylene glycol, and polytetramethylene glycol, and the like.

The components that form these polyesters can be used each individually or in a combination of two or more components. Furthermore, components that form an aromatic polyester such as terephthalic acid may be used in combination provided that the properties as a degradable resin are not lost.

Preferred examples of the aliphatic polyester include hydroxycarboxylic acid-based aliphatic polyesters such as polylactic acid (also called "PLA" hereinafter) and polyglycolic acid (also called "PGA" hereinafter); lactone-based aliphatic polyesters such as poly-ε-caprolactone (also called "PCL" hereinafter); diol-dicarboxylic acid-based aliphatic polyesters such as polyethylene succinate and polybutylene succinate; copolymers thereof, such as glycolic acid-lactic acid copolymers (also called "PGLA" hereinafter); mixtures thereof; and the like. Aliphatic polyesters that use combinations of aromatic components such as polyethylene adipate/terephthalate may also be used.

The PGA encompasses not only homopolymers of glycolic acid, but also copolymers containing not less than 50 mass %, preferably not less than 75 mass %, more preferably not less than 85 mass %, even more preferably not less than 90 mass %, particularly preferably not less than 95 mass %, most preferably not less than 99 mass %, and above all, preferably not less than 99.5 mass %, of glycolic acid repeating units. The PLA encompasses not only homopolymers of L-lactic acid or D-lactic acid, but also copolymers containing not less than 50 mass %, preferably not less than 75 mass %, more preferably not less than 85 mass %, and even more preferably not less than 90 mass %, of L-lactic acid or D-lactic acid repeating units, as well as stereocomplex polylactic acids obtained by forming a stereocomplex by mixing a poly-L-lactic acid and a poly-D-lactic acid to advantageously mesh the respective molecular chains. As the PGLA, a copolymer in which the ratio (mass ratio) of glycolic acid repeating units to lactic acid repeating units is from 99:1 to 1:99, preferably from 90:10 to 10:90, and more preferably from 80:20 to 20:80, may be used.

Melt Viscosity

As the aliphatic polyester such as PGA, PLA, or PGLA, one having a melt viscosity of normally 50 to 5000 Pa·s, preferably from 80 to 3000 Pa·s, and more preferably from 100 to 1500 Pa·s, may be used. Melt viscosity is measured at a temperature of 240° C. and a shear rate of 122 sec$^{-1}$. When the melt viscosity is too low, the strength of the obtained aliphatic polyester may be low and an excellent proppant settlement inhibiting effect may not be obtained. When the melt viscosity is too high, there is risk that the aliphatic polyester will undergo thermal degradation since a high melting temperature is required for manufacturing the degradable fiber.

Other Blended Components

As other blended components, other resin materials and various additives such as stabilizers, biodegradation accelerators or biodegradation inhibitors, hydrolysis accelerators or hydrolysis inhibitors, reinforcing materials, and the like may be contained or blended in the aliphatic polyester within a range that does not hinder the objective of the present invention. The other blended components are normally used in a proportion of 0 to 100 parts by mass relative to 100 parts by mass of the aliphatic polyester, but when degradability and proppant settlement inhibiting effect are taken into consideration, the proportion is preferably not greater than 80 parts by mass, more preferably not greater than 50 parts by mass, or, depending on the case, not greater than 30 parts by mass.

Polyvinyl Alcohol Fiber

Polyvinyl alcohol fiber formed from polyvinyl alcohol, and more specifically water-soluble polyvinyl alcohol fiber, is fiber formed from polyvinyl alcohol with a degree of saponification of 70 to 99.9 mol % and dissolves in water having a temperature of 20 to 100° C. The polyvinyl alcohol is obtained by hydrolyzing (saponifying) the acetoxy group of polyvinyl acetate using an acid or an alkali to form a hydroxyl group. The solubility in water of the polyvinyl alcohol that forms the polyvinyl alcohol fiber can be controlled through its degree of saponification, molecular weight, structure, and the like, and may be selected as appropriate according to the usage environment. Furthermore, the various additives described above may be included in the polyvinyl alcohol.

(2) Oligomer Component Content in Resin that Forms Outer Surface of Fiber

The degradable fiber for use in well treatment fluid of the present invention has the feature that the oligomer component content in the resin that forms the outer surface of the fiber is not greater than 1 mass %. Due to the fact that the oligomer component content in the resin that forms the outer surface of the fiber is not greater than 1 mass %, the degradable fiber for use in well treatment fluid of the present invention has excellent dispersibility in well treatment fluid and is hydrolyzable and biodegradable, and as a result, can achieve an excellent proppant settlement inhibiting effect in well treatment fluid.

In the case where the degradable fiber for use in well treatment fluid is a fiber formed from one type of resin composition (containing degradable resin) (also called "single-layer fiber" hereinafter), the term "resin that forms the outer surface of the fiber in the degradable fiber for use in well treatment fluid of the present invention" means the resin itself that forms the single-layer fiber (which is the degradable fiber for use in well treatment fluid). In the case where the degradable fiber for use in well treatment fluid is a composite fiber to be described in detail later, it means the layer present on the outermost surface of the composite fiber. For example, in the case of a core-sheath composite fiber, it means the resin that forms the sheath component. Furthermore, in the case where a plurality of types of fiber (and thus a plurality of resin compositions) are present on the outermost surface, the oligomer component content of the plurality of types of resin that form the plurality of types of fiber may be measured, and the arithmetic mean thereof may be taken as the oligomer component content in the resin that forms the outer surface of the fiber.

The "oligomer component" in the resin means the number of repeating units of the resin that forms the degradable resin. For example, when the degradable resin is an aliphatic polyester, it normally means the low polymer of which the number of ester-forming units is lower than that of the resin used in molding (including fiber formation). When this number is high, the resin used in molding can be distinguished by its physical properties or characteristics. The number of repeating units in the oligomer component varies depending on the type of degradable resin, but, for example, in the case where the degradable resin is an aliphatic polyester formed from a hydroxycarboxylic acid, it is approximately from 1 to 50. In the degradable fiber for use in well treatment fluid of the present invention, as the oligomer component used when the oligomer component content in the resin that forms the outer surface of the fiber is not greater than 1 mass %, it is a low polymer of which the number of the aforementioned repeating units is normally from 1 to 30, or, depending on the case, from 1 to 20, taking into consideration the ease of distinguishing it from the resin used in molding by its physical properties or characteristics. Accordingly, a dimer in which the number of repeating units is two also qualifies as the oligomer component, and in the case where, for example, the degradable resin is an aliphatic polyester formed from a hydroxycarboxylic acid, a cyclic dimer such as a lactide or glycolide also qualifies. Additionally, a monomer in which the number of repeating units is one also qualifies as the oligomer component, and in the case where, for example, the degradable resin is an aliphatic polyester formed from a hydroxycarboxylic acid, lactic acid, glycolic acid, and the like also qualify.

The degradable fiber for use in well treatment fluid of the present invention can demonstrate an excellent proppant settlement inhibiting effect in well treatment fluid as long as the oligomer component content in the resin that forms the outer surface of the fiber is not greater than 1 mass %, and an even greater effect may be realized when it is preferably not greater than 0.9 mass %, more preferably not greater than 0.8 mass %, and even more preferably not greater than 0.6 mass %. The lower limit of the oligomer component content is 0 mass %, but it is normally 0.005 mass %, and in many cases is approximately 0.01 mass %.

Method for Measuring Oligomer Component Content in Resin that Forms Outer Surface of Fiber The oligomer component content in the resin that forms the outer surface of the fiber of the degradable fiber for use in well treatment fluid can be measured by the following method. Specifically, using a solvent that can dissolve the oligomer component in the degradable resin without dissolving the degradable resin that forms the outer surface of the fiber of the degradable fiber, for example, a solvent such as acetone in the case where the degradable resin is a polyglycolic acid-based resin, 1 g of degradable fiber is soaked overnight in 200 mL of the solvent, and then the soaked fiber is removed from the solvent and air-dried for one day at room temperature. The mass of the fiber after drying is measured, and the difference between it and the mass of the degradable fiber before soaking in solvent (also called "initial mass" hereinafter; specifically, 1 g) is determined as the mass of the oligomer component in the degradable resin, and the oligomer component content (units: mass %) is calculated from the proportion of the mass of the oligomer component relative to the initial mass. Note that in this measurement method, because a solvent that does not dissolve the degradable resin is used, when the degradable fiber is soaked, the oligomer extracted from the degradable resin in the solvent is only that derived from the resin that forms the outer surface of the degradable fiber.

(3) Birefringence

The degradable fiber for use in well treatment fluid of the present invention also has the feature that its birefringence is not less than 0.02. Due to the fact that the birefringence of the fiber is not less than 0.02, the degradable fiber for use in well treatment fluid of the present invention has excellent dispersibility in well treatment fluid and is degradable, specifically hydrolyzable and biodegradable, and as a result, can achieve an excellent proppant settlement inhibiting effect in well treatment fluid.

Method for Measuring Birefringence

The birefringence of the degradable fiber for use in well treatment fluid of the present invention can be measured by the following method. Specifically, using a polarizing microscope, the retardation (phase difference) is determined by negating the interference color of the fiber sample under a crossed Nichol prism using a Berek compensator, and birefringence is calculated by dividing the determined retardation by the fiber diameter.

The birefringence of the degradable fiber for use in well treatment fluid of the present invention is preferably not less than 0.025, more preferably not less than 0.03, and, depending on the case, not less than 0.04. There is no particular upper limit of birefringence, but it is normally approximately 0.15, and in many cases approximately 0.12.

(4) Fineness, Length, and Fiber Diameter of Degradable Fiber for Use in Well Treatment Fluid The fineness and length of the degradable fiber for use in well treatment fluid of the present invention are not limited as long as the dispersibility of the degradable fiber in well treatment fluid is excellent and the proppant settlement inhibiting effect in well treatment fluid is excellent as a result. Normally, a fiber having fineness of approximately from 0.1 to 20 de and length (fiber length) of approximately from 0.3 to 100 mm may be used, but preferably, fineness is from 0.3 to 10 de and/or fiber length is from 0.5 to 50 mm, and more preferably, fineness is from 0.5 to 5 de and fiber length is from 1 to 30 mm. Furthermore, fiber having a fiber diameter of normally from 4 to 50 μm, preferably from 6 to 40 μm, and more preferably approximately from 8 to 30 μm may be used. The fineness of the degradable fiber for use in well treatment fluid is measured in accordance with JIS L1013. As for the fiber diameter and length of the degradable fiber for use in well treatment fluid, a cross-section of the fiber or its entirety is observed by optical microscope, and the diameter or length of the fiber in the image is measured.

(5) Composite Fiber

The degradable fiber for use in well treatment fluid of the present invention may be a monofilament, which is a single-layer fiber formed from one type of resin composition (containing degradable resin), or a multifilament yarn, but it may also be used as a composite fiber with a fiber formed from another type of resin composition (preferably containing a degradable resin). As composite fibers, any conventionally known form of composite fiber may be employed, such as a core-sheath type, eccentric core-sheath type, side-by-side type, split fiber type, or sea-island type.

(6) Dispersibility of Degradable Fiber for Use in Well Treatment Fluid

Due to the fact that the degradable fiber for use in well treatment fluid of the present invention has the features that the oligomer component content in the resin that forms the outer surface of the fiber is not greater than 1 mass % and the birefringence of the fiber is not less than 0.02, the dispersibility of the degradable fiber in well treatment fluid is excellent, and as a result, the proppant settlement inhibiting effect in well treatment fluid can be excellent, and more specifically, the proppant settlement inhibiting effect in well treatment fluid can be large.

The dispersibility of the degradable fiber in well treatment fluid can be evaluated by the following method. Specifically, 1 g of degradable fiber is put in 500 mL of room-temperature water (well treatment fluid), and after being stirred gently several times, it is left to stand for one minute, and the state of dispersion of the degradable fiber in the water is observed macroscopically and microscopically. The dispersibility of the degradable fiber is evaluated according to the following evaluation criteria.

Evaluation Criteria of Dispersibility of Degradable Fiber

A (excellent): Degradable fiber is in a uniform and well dispersed state in water. No bundling is observed by microscope.

B (good): Degradable fiber is in a uniform and well dispersed state in water. Almost no bundling is observed by microscope.

C (fair): State of dispersion of degradable fiber in water is fair. Bundling is observed by microscope.

D (poor): State of dispersion of degradable fiber in water is poor. Numerous bundles are observed by microscope.

E (very poor): State of dispersion of degradable fiber in water is very poor. Bundles of several degradable fibers are observed by microscope.

With the degradable fiber for use in well treatment fluid of the present invention, the dispersibility of the degradable fiber in well treatment fluid is excellent, and its evaluation based on the above evaluation criteria is A or B. If the evaluation is A, the degradable fiber can be said to disperse in the single-fiber state in the well treatment fluid, i.e., the treatment fluid for hydrocarbon resource recovery, based on the fact that the degradable fiber disperses well and uniformly in the well treatment fluid, i.e., the treatment fluid for hydrocarbon resource recovery, and bundles are not seen in observation by microscope.

3. Well Treatment Fluid

The degradable fiber for use in well treatment fluid of the present invention can form a well treatment fluid together with the treatment fluid for hydrocarbon resource recovery, proppant, and additives described above.

Content of Degradable Fiber for Use in Well Treatment Fluid

The content of the degradable fiber for use in well treatment fluid of the present invention is not particularly limited, and is, for example, approximately from 0.01 to 10 mass % and normally approximately from 0.05 to 5 mass %. The optimal range can be selected according to the type and objective of the well treatment fluid, the type, shape, and size of degradable fiber for use in well treatment fluid, and the like. When the content of the degradable fiber for use in well treatment fluid in the well treatment fluid is high, the proppant settlement inhibiting effect tends to be better.

Proppant Settlement Inhibiting Effect

The degradable fiber for use in well treatment fluid of the present invention has an excellent proppant settlement inhibiting effect in well treatment fluid. The proppant settlement inhibiting effect in well treatment fluid can be evaluated by measuring the proppant dispersibility by the following method.

Measurement of Proppant Dispersibility

Specifically, i) 0.2 g of xanthan gum (XCD-Polymer manufactured by Telnite Co., Ltd.) and 2.0 g of starch (Telpolymer DX manufactured by Telnite Co., Ltd.) are added as additives to 100 mL of a 10 mass % concentration NaCl aqueous solution and stirred for one minute to prepare a polymer aqueous solution.

ii) 0.2 g of degradable fiber for use in well treatment fluid is added to the prepared polymer aqueous solution and further stirred for one minute to prepare a degradable fiber-dispersed polymer aqueous solution.

iii) 6 g of a proppant (Bauxite 20/40 manufactured by SINTEX) is added to the prepared degradable fiber-dispersed polymer aqueous solution and stirred for one minute to prepare a proppant/degradable fiber-dispersed polymer aqueous solution.

iv) The prepared proppant/degradable fiber-dispersed polymer aqueous solution is put in a graduated cylinder of volume 100-mL, and the mark of the graduated cylinder at which the highest part of the proppant/degradable fiber-dispersed polymer aqueous solution is located (called "mark before being left to stand" hereinafter) is read. Taking this as "0 mL," the mark at the lowest part of the graduated cylinder is taken as "100 mL."

v) Then, after being left to stand for one hour, the mark of the graduated cylinder at which the highest part of the proppant is located (called "mark after being left to stand" hereinafter) is read (units: mL).

Proppant dispersibility is measured three times and evaluated in accordance with the following evaluation criteria based on the average of the three measurements. Evaluation of the proppant settlement inhibiting effect is the same as evaluation of proppant dispersibility, and if the proppant dispersibility evaluation is A or B, it can be said that the proppant settlement inhibiting effect is excellent.

Proppant Dispersibility Evaluation Criteria

A (excellent): The mark after being left to stand is less than 40 mL.

B (good): The mark after being left to stand is not less than 40 mL and less than 55 mL.

C (fair): The mark after being left to stand is not less than 55 mL and less than 70 mL.

D (poor): The mark after being left to stand is not less than 70 mL.

Correlation Between Dispersibility of Degradable Fiber and Proppant Settlement Inhibiting Effect The present inventors discovered that there is a high correlation between the dispersibility of the degradable fiber in well treatment fluid and the proppant settlement inhibiting effect. Specifically, a degradable fiber having an evaluation of A in dispersibility in well treatment fluid has an evaluation of A in proppant dispersibility, and a degradable fiber having an evaluation of E in dispersibility in well treatment fluid has an evaluation of D in proppant dispersibility. According to additional investigation by the present inventors, it was understood that the dispersibility of degradable fiber in proppant/degradable fiber-dispersed polymer aqueous solution exhibits the same behavior as dispersibility of degradable fiber in water, and therefore, in a system in which dispersibility of the degradable fiber is good (a proppant/degradable fiber-dispersed polymer aqueous solution), settling of the proppant is inhibited by a degradable fiber that is well dispersed in a single-fiber state preferably without bundles forming, and the proppant/degradable fiber-dispersed polymer aqueous solution is maintained for a long period of time at the top part of the graduated cylinder. In short, it was understood that the proppant settlement inhibiting effect is high. In contrast, it was understood that in a system in which dispersibility of the degradable fiber is poor, because the degradable fibers form bundles with each other, the degradable fiber cannot supplement the proppant in the proppant/degradable fiber-dispersed polymer aqueous solution, and therefore the proppant readily settles.

4. Method for Manufacturing Degradable Fiber for Use in Well Treatment Fluid

The method for manufacturing the degradable fiber for use in well treatment fluid of the present invention is not limited as long as it can produce a degradable fiber for use in well treatment fluid that exhibits the anticipated effect of an excellent proppant settlement inhibiting effect. It is a method for manufacturing a degradable fiber for use in well treatment fluid comprising a spinning step and a drawing step, wherein the oligomer component content in the resin that forms the outer surface of the undrawn yarn obtained in the spinning step is not greater than 1 mass %, and the birefringence of the drawn yarn before heat treatment in the drawing step is not less than 0.02. As a result, it is preferred because it can easily produce a degradable fiber for use in well treatment fluid in which the oligomer component content in the resin that forms the outer surface of the fiber is not greater than 1 mass % and the birefringence of the fiber is not less than 0.02. The degradable fiber for use in well treatment fluid of the present invention can be manufactured by, for example, the following method comprising a spinning step and a drawing step.

Spinning Step

Degradable resin having a shape such as pellet form is loaded into an extruder, and it is discharged in fiber form from a spinneret while being hot-melted and measured, and, if desired, groups of the fibers discharged from the spinneret are bundled. After they are cooled by air cooling and/or water cooling to not greater than the melting point of the degradable resin, they are coated with an oiling agent as necessary, and they are stored in a can in the form of undrawn yarn (UDY), or they are wound with a prescribed length onto a bobbin, thereby producing undrawn yarn. To make the oligomer component content in the resin that forms the outer surface of the undrawn yarn obtained in the spinning step not greater than 1 mass %, and more preferably not greater than 0.6 mass %, it is preferable to control the humidity to suppress moisture absorption of the degradable resin in the spinning step. Specifically, it is desirable to prevent moisture from entering the starting material hopper part used when loading the degradable resin into the extruder by purging it with dry air or nitrogen. Furthermore, to suppress generation of oligomer accompanying thermolysis of the degradable resin in the extruder and/or the nozzle part in the spinning step, spinning must be performed at an optimal extrusion temperature and/or residence time. When using a plurality of types of resin (resin composition) such as in the manufacture of a core-sheath composite fiber, especially when using resins (resin compositions) having different melting points, thermolysis temperatures, or processing temperatures, the extruder conditions for extruding each resin (resin composition) must be selected while taking into consideration the shapes of the merging sections considering the processing temperature and residence time of the merging sections of the plurality of resins, and while taking into consideration the overall processing conditions while passing through them.

Drawing Step

The undrawn yarn obtained in the spinning step is taken up at a prescribed velocity through a first group of rollers adjusted to a prescribed temperature for preheating the undrawn yarn as necessary, and then it is supplied to a drawing bath provided with oil, water, or steam adjusted to a prescribed temperature, and then it is drawn by passing through a second group of rollers (group of drawing rollers) having a prescribed temperature different from that of the first group of rollers, and drawn yarn, preferably drawn yarn having birefringence before heat treatment of not less than 0.02, is obtained. The drawing ratio is not particularly limited, but is normally from 120 to 600%, preferably from 150 to 550%, and more preferably from 200 to 500%. The drawing temperature is determined according to the type and composition of the degradable resins, and is normally in a range from the glass transition temperature (also called "Tg" hereinafter) of the degradable resin to Tg+50° C., preferably from Tg+5° C. to Tg+45° C., and more preferably from Tg+10° C. to Tg+40° C. One or a plurality of drawing baths and groups of drawing rollers may be used, and when a plurality thereof are used, the drawing baths and drawing rollers may employ different temperatures and/or velocities. Then, as necessary, the drawn yarn drawn at a prescribed ratio undergoes crimping treatment and/or heat treatment (also called "heat setting treatment"). The heat treatment temperature and heat treatment time may be set as appropriate in accordance with the type and composition of degradable resin, the drawing ratio, the relaxation or tensile conditions during heat treatment, and the like, but heat treatment is normally performed at a temperature not greater than the melting point and for a time of from 1 second to 30 minutes. Furthermore, heat treatment may be divided into multiple treatments, and in this case, they may be performed at different heat treatment temperatures and for different heat treatment times. The fineness of the obtained degradable fiber is normally from 0.1 to 20 de, preferably from 0.3 to 10 de, and more preferably from 0.5 to 5 de. Furthermore, if desired, they may be cut into short degradable fiber of a prescribed length with a cutter. The length of the short degradable fiber is not particularly limited, but is normally from 0.3 to 100 mm, preferably from 0.5 to 50 mm, and more preferably from 1 to 30 mm.

Heat treatment is performed as necessary in order to suppress shrinkage under the usage environment of the degradable fiber for use in well treatment fluid, to adjust the degree of orientation of the degradable fiber by relaxation treatment, to obtain more highly oriented fiber than before by two-stage drawing, and to reduce the moisture ratio of the degradable fiber. Due to the fact that the birefringence of the drawn yarn before heat treatment in the drawing step is not less than 0.02, preferably not less than 0.03, and more preferably not less than 0.04, heat treatment performed to obtain a degradable fiber for use in well treatment fluid of which the birefringence is not less than 0.02 may be performed under more mild conditions. Furthermore, heat treatment may be unnecessary depending on the value of birefringence of the drawn yarn before heat treatment. When the birefringence of the drawn yarn before heat treatment is too low, oriented crystallization of the fiber before heat treatment is insufficient, and as a result, the phenomenon of adhesion of amorphous portions present on the outer surface of the fiber may occur accompanying heat treatment, which adversely affects the state of fiber dispersion in the well treatment fluid, thereby reducing the proppant settlement inhibiting effect. When the birefringence before heat treatment is not less than 0.02, the outer surface of the fiber is completely crystallized and the adhesion does not occur, which is preferred.

Manufacturing of Cut Fiber

The obtained drawn degradable fiber may be cut as necessary to produce degradable fiber for use in well treatment fluid having the desired fiber length. The method for cutting the drawn degradable fiber is not particularly limited, but the fiber may be cut, for example, using an EC cutter (rotary blade fiber bundle cutter). Furthermore, as necessary, the fiber may be coated with an oiling agent by spraying or the like before cutting, and after being coated with an oiling agent by spraying or the like, it may be cut after further heat treatment. Additionally, the moisture ratio of the degradable fiber may be reduced by heat treating the degradable fiber after cutting.

Method for Manufacturing Composite Fiber

As previously described, the degradable fiber for use in well treatment fluid of the present invention may be a composite fiber with another type of fiber, preferably another type of degradable fiber. As composite fibers, any conventionally known form of composite fiber may be employed, such as a core-sheath type, eccentric core-sheath type, side-by-side type, split fiber type, or sea-island type. A degradable fiber for use in well treatment fluid that is such a composite fiber may itself be spun by conventionally known methods for manufacturing composite fiber. The spun composite fiber may undergo a drawing step by a method described above, and it may be cut as necessary to produce degradable fiber for use in well treatment fluid having the desired fiber length.

5. Well Treatment Method

The well treatment method of the present invention is characterized by using a well treatment fluid containing the degradable fiber for use in well treatment fluid of the present invention and a proppant. That is, it is well treatment performed for excavating and producing a hydrocarbon resource such as petroleum or natural gas through a well (borehole) having a porous and permeable subterranean formation. More specifically, it is treatment such as well drilling, fracturing, cementing, temporary plugging, and finishing. By the well treatment method using a well treatment fluid containing the degradable fiber for use in well treatment fluid of the present invention and a proppant, the proppant in a viscous carrier fluid is prevented from settling while the well treatment fluid containing the proppant is being transported to the location where well stimulation such as fracturing is performed, and after well stimulation such as fracturing, the degradable fiber can be easily degraded and removed.

EXAMPLES

The present invention will be described further using working examples and comparative examples below, but the present invention is not limited to these examples. The methods for measuring the characteristics and physical properties for the degradable fiber for use in well treatment and the degradable resin that forms the fiber in the working examples and comparative examples are as follows.

Molecular Weight

The molecular weight of the resin material that forms the degradable fiber was measured by gel permeation chromatography (GPC).

Melting Point and Glass Transition Temperature

The melting point and glass transition temperature of the resin material that forms the degradable fiber were measured by differential scanning calorimeter (DSC).

Melt Viscosity

The melt viscosity of the resin material that forms the degradable fiber was measured at a temperature of 240° C. and a shear rate of 122 $\sec^{-1}$ using a capillograph equipped with nozzles of D=0.5 mm and L=5 mm (Capillograph 1A, manufactured by Toyo Seiki Seisaku-sho, Ltd.).

Oligomer Component Content in the Resin that Forms Outer Surface of Fiber

The oligomer component content in the resin that forms the outer surface of fiber of the degradable fiber was measured by the following method. Specifically, 1 g of the degradable fiber was soaked overnight in 200 mL of acetone, and then the soaked fiber was removed from the solvent and air-dried for one day at room temperature. The mass of the fiber after drying was measured, and the difference between it and the mass of the degradable fiber before soaking in solvent ("initial mass," i.e., 1 g) was determined as the mass of the oligomer component in the degradable resin, and the oligomer component content (units: mass %) was calculated from the proportion of the mass of the oligomer component relative to the initial mass.

Fineness

The fineness of the degradable fiber (units: de) was measured in conformance with JIS L1013.

Birefringence

The birefringence of the degradable fiber for use in well treatment fluid of the present invention was measured by the following method. Specifically, using a polarizing microscope (BH-2 manufactured by Olympus Corp.), the retardation (phase difference) was determined by negating the interference color of the fiber sample under a crossed Nichol prism using a Berek compensator, and birefringence was calculated by dividing the determined retardation by the fiber diameter measured separately.

Dispersibility of Degradable Fiber

The dispersibility of the degradable fiber in a well treatment fluid was evaluated by the following method. Specifically, 1 g of degradable fiber was put in 500 mL of room-temperature water (well treatment fluid), and after being stirred gently several times, it was left to stand for one minute, and the state of dispersion of the degradable fiber in the water was observed macroscopically and microscopically. The dispersibility of the degradable fiber was evaluated according to the following evaluation criteria.

Evaluation Criteria of Dispersibility

A (excellent): Degradable fiber is in a uniform and well dispersed state in water. No bundling is observed by microscope.

B (good): Degradable fiber is in a uniform and well dispersed state in water. Almost no bundling is observed by microscope.

C (fair): State of dispersion of degradable fiber in water is fair. Bundling is observed by microscope.

D (poor): State of dispersion of degradable fiber in water is poor. Numerous bundles are observed by microscope.

E (very poor): State of dispersion of degradable fiber in water is very poor. Bundles of several degradable fibers are observed by microscope.

Proppant Settlement Inhibiting Effect

The proppant settlement inhibiting effect in well treatment fluid was evaluated by measuring the proppant dispersibility by the following method. Specifically, i) 0.2 g of xanthan gum (XCD-Polymer manufactured by Telnite Co., Ltd.) and 2.0 g of starch (Telpolymer DX manufactured by Telnite Co., Ltd.) were added as additives to 100 mL of a 10 mass % concentration NaCl aqueous solution and stirred for one minute to prepare a polymer aqueous solution.

ii) 0.2 g of degradable fiber for use in well treatment fluid was added to the prepared polymer aqueous solution and further stirred for one minute to prepare a degradable fiber-dispersed polymer aqueous solution.

iii) 6 g of a proppant (Bauxite 20/40 manufactured by SINTEX) was added to the prepared degradable fiber-dispersed polymer aqueous solution and stirred for one minute to prepare a proppant/degradable fiber-dispersed polymer aqueous solution.

iv) The prepared proppant/degradable fiber-dispersed polymer aqueous solution was put in a graduated cylinder of volume 100-mL, and the mark of the graduated cylinder at which the highest part of the proppant/degradable fiber-dispersed polymer aqueous solution was located (called "mark before being left to stand" hereinafter) was read. Taking this as "0 mL," the mark at the lowest part of the graduated cylinder was taken as "100 mL."

v) Then, after being left to stand for one hour, the mark of the graduated cylinder at which the highest part of the proppant was located (called "mark after being left to stand" hereinafter) was read.

Proppant dispersibility was measured three times and evaluated in accordance with the following evaluation criteria based on the average of the three measurements. The evaluation of proppant settlement inhibiting effect was the same as the evaluation of proppant dispersibility.

Proppant Dispersibility Evaluation Criteria

A (excellent): The mark after being left to stand is less than 40 mL.

B (good): The mark after being left to stand is not less than 40 mL and less than 55 mL.

C (fair): The mark after being left to stand is not less than 55 mL and less than 70 mL.

D (poor): The mark after being left to stand is not less than 70 mL.

Working Example 1

Spinning Step

Pellet-form PLA (manufactured by NatureWorks LLC, weight average molecular weight: 260,000, glass transition temperature: 60° C., melting point: 170° C., melt viscosity (temperature 240° C., shear rate 122 $sec^{-1}$): 500 Pa·s) was loaded from a nitrogen-replaced (also called "$N_2$-purged" hereinafter) starting material hopper into a uniaxial extruder (manufactured by Plagiken Co., Ltd.), and melted at 150 to 230° C. While the melted PLA was measured using a gear pump, it was discharged from a 230° C. spinneret (for fiber; 24 holes of diameter 0.4 mm) to form fibrous PLA, which was then cooled with 30° C. air, bundled, coated with an oiling agent for fiber ("Lurol" manufactured by Goulston Technologies, Inc.), taken up at a circumferential velocity of 500 m/min, and wound onto bobbins in a length of 5000 m per bobbin to produce PLA undrawn yarn. When the oligomer component content of the PLA that formed the PLA undrawn yarn was measured, it was 0.3 mass %.

Drawing Step

A bobbin on which the PLA undrawn yarn had been wound was mounted on a drawing apparatus and wound off at a velocity of 38.5 m/min, and then passed through a 70° C. water drawing bath and drawn to a ratio of 248%. It was then passed through a steam bath (temperature 100° C.) to perform heat treatment (simultaneously being drawn to a ratio of 105%), and then it was taken up at a velocity of 100 m/min, thereby producing PLA drawn yarn (fineness 1.5 de) having a total drawing ratio of 260%. Note that when the PLA undrawn yarn (drawn yarn before heat treatment) that had been passed through a water drawing bath (before being passed through the steam bath) was removed and the birefringence was measured, it was 0.06.

Manufacturing of Cut Fiber

The obtained PLA drawn yarn was sprayed with an oiling agent ("Lurol" manufactured by Goulston Technologies, Inc.) and cut to a length of 6 mm with an EC cutter (rotary blade fiber bundle cutter) to produce PLA fiber which is degradable fiber for use in well treatment fluid. When the birefringence of the obtained degradable fiber was measured, it was 0.07.

Degradable Fiber Dispersibility and Proppant Dispersibility

For the obtained degradable fiber for use in well treatment fluid, the degradable fiber dispersibility and proppant settlement inhibiting effect were measured and evaluated. Table 1 (divided into Table 1-1 and Table 1-2) shows the evaluation results together with the fineness of the degradable fibers (also simply called "fineness" hereinafter), the fiber length of the degradable fibers (also simply called "fiber length" hereinafter), the oligomer component content in the resin that forms the outer surface of the degradable fibers (also simply called "oligomer component content" hereinafter), the characteristics of the degradable fibers such as birefringence, and the manufacturing conditions of the degradable fibers in the spinning step and the drawing step (collectively called "degradable fiber characteristics and the like" hereinafter).

Working Example 2

PLA fiber which is a degradable fiber for use in well treatment fluid was produced in the same manner as Working Example 1 except that in the spinning step, the upper limit of the melting temperature and the temperature of the spinneret were changed to 250° C., the spinneret was changed to one having 350 holes of diameter 0.4 mm, the extruded resin quantity was increased, the take-up velocity of the PLA undrawn yarn was changed to 1000 m/min, and it was put into a UDY storage can. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Working Example 3

PLA fiber which is a degradable fiber for use in well treatment fluid was produced in the same manner as Working Example 1 except that in the step of manufacturing the cut fiber, an oiling agent was not sprayed. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Working Example 4

PLA fiber which is a degradable fiber for use in well treatment fluid was produced in the same manner as Working Example 1 except that in the step of manufacturing the cut fiber, it was cut to a length of 4 mm. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Working Example 5

PLA fiber which is a degradable fiber for use in well treatment fluid was produced in the same manner as Working Example 1 except that in the step of manufacturing the cut fiber, it was cut to a length of 10 mm. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Working Example 6

PLA fiber which is degradable fiber for use in well treatment fluid was produced in the same manner as Working Example 1 except that the starting material hopper was purged with dry air instead of $N_2$ (simply called "Dry air" hereinafter). For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Working Example 7

PLA fiber which is degradable fiber for use in well treatment fluid was produced in the same manner as Working Example 1 except that the wind-off velocity from the PLA undrawn yarn was changed to 55 m/min, the drawing ratio in the 70° C. water drawing bath was changed to 173%, heat treatment was performed using an 80° C. hot water bath instead of a steam bath, and the total drawing ratio was changed to 182%. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Working Example 8

PGA fiber which is a degradable fiber for use in well treatment fluid was produced in the same manner as Working Example 1 except that in the spinning step, pellet-form PGA (manufactured by Kureha Corporation, weight average molecular weight: 200,000, glass transition temperature: 44° C., melting point: 220° C., melt viscosity (temperature 240° C., shear rate 122 sec$^{-1}$): 500 Pa·s)) was used instead of pellet-form PLA, the upper limit of the melting temperature and the temperature of the spinneret were changed to 250° C. to produce PGA undrawn yarn, the temperature of the water drawing bath in the drawing step was changed to 65° C., and the total drawing ratio was changed to 450%. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Working Example 9

PGA/PLA composite fiber which is a degradable fiber for use in well treatment fluid was produced in the same manner as Working Example 8 except that in the spinning step, an undrawn yarn of core-sheath composite fiber made of PGA and PLA (core component:PGA/sheath component: PLA=70/30) was obtained instead of PGA undrawn yarn, the starting material hopper was purged with dry air instead of $N_2$ (Dry air), the spinneret was changed to one having 36 holes with a hole diameter of 0.25 mm, the take-up velocity was changed to 1000 m/min, the total drawing ratio was changed to 260%, and the fineness of the obtained degradable fiber for use in well treatment fluid was changed to 1.8 de. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Working Example 10

PGA/PLA composite fiber which is a degradable fiber for use in well treatment fluid was produced in the same manner as Working Example 9 except that the core-sheath composite fiber made of PGA and PLA was changed to that having a ratio of core component:PGA/sheath component: PLA=50/50. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Working Example 11

PGA/PLA composite fiber which is a degradable fiber for use in well treatment fluid was produced in the same manner as Working Example 9 except that the core-sheath composite fiber made of PGA and PLA was changed to that having a ratio of core component:PGA/sheath component: PLA=20/80. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Working Example 12

A PGA/PLA composite fiber which is a degradable fiber for use in well treatment fluid was produced in the same manner as Working Example 10 except that in the spinning step, the upper limit of the melting temperature and the temperature of the spinneret were changed to 260° C., the spinneret was changed to one having 350 holes of diameter 0.4 mm, the extruded resin quantity was increased, and the fineness of the obtained degradable fiber for use in well treatment fluid was changed to 1.1 de. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Working Example 13

PGA/PLA composite fiber which is a degradable fiber for use in well treatment fluid was produced in the same manner as Working Example 12 except that the fineness of the obtained degradable fiber for use in well treatment fluid was changed to 4.0 de and the total drawing ratio was 450%. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Working Example 14

Polybutylene adipate/terephthalate (also called "PBAT" hereinafter) fiber which is a degradable fiber for use in well treatment fluid was produced in the same manner as Working Example 1 except that in the spinning step, a PBAT copolymer (Ecoflex® manufactured by BASF) was used instead of PLA, the upper limit of the melting temperature and the temperature of the spinneret were changed to 150° C., the temperature of the drawing bath was changed to 25° C., heat treatment using an 80° C. hot water bath was performed instead of heat treatment using a steam bath, and the fineness of the obtained degradable fiber for use in well treatment fluid was changed to 1.8 de. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Working Example 15

Polybutylene succinate (also called "PBS" hereinafter) fiber which is a degradable fiber for use in well treatment fluid was produced in the same manner as Working Example 14 except that in the spinning step, PBS (GS-Pla® manufactured by Mitsubishi Chemical Corp.) was used instead of PBAT. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Working Example 16

Polybutylene succinate/adipate (also called "PBSA" hereinafter) fiber which is a degradable fiber for use in well treatment fluid was produced in the same manner as Working Example 14 except that in the spinning step, PBSA (Bionolle® manufactured by Showa Denko K.K.) was used instead of PBAT. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Working Example 17

PGA/PLA fiber which is a degradable fiber for use in well treatment fluid was produced in the same manner as Working Example 8 except that in the spinning step, a blend of PGA and PLA (PGA/PLA=80/20 (mass ratio)) was used instead of PGA, the fineness of the obtained degradable fiber for use in well treatment fluid was changed to 1.8 de, and the total drawing ratio was changed to 260%. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Working Example 18

PGA/PLA fiber which is a degradable fiber for use in well treatment fluid was produced in the same manner as Working Example 17 except that in the spinning step, a blend of PGA and PLA (PGA/PLA=20/80 (mass ratio)) was used instead of the blend of PGA and PLA (PGA/PLA=80/20 (mass ratio)). For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Comparative Example 1

PLA fiber which is a degradable fiber for use in well treatment fluid was produced in the same manner as Working Example 1 except that in the spinning step, the starting material hopper was not purged with $N_2$. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Comparative Example 2

PGA/PLA composite fiber which is a degradable fiber for use in well treatment fluid was produced in the same manner as Working Example 9 except that in the spinning step, the starting material hopper was not purged with dry air. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Comparative Example 3

PLA fiber which is a degradable fiber for use in well treatment fluid was produced in the same manner as Working Example 1 except that in the drawing step, the wind-off velocity of the PLA undrawn yarn was changed to 55.0 m/min, and the drawing ratio in the 70° C. water drawing bath was changed to 120%. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.

Comparative Example 4

PLA fiber which is degradable fiber for use in well treatment fluid was produced in the same manner as Comparative Example 3 except that in the drawing step, the drawing ratio in the 70° C. water drawing bath was changed to 173%, and heat treatment was performed using 120° C. dry air instead of using a steam bath. For the obtained degradable fiber for use in well treatment fluid, the degradable fiber dispersibility and proppant settlement inhibiting effect were measured and evaluated. Table 1 shows the evaluation results together with the characteristics and the like of the degradable fiber.-1

TABLE 1-1

| | | | Working Example 1 | Working Example 2 | Working Example 3 | Working Example 4 | Working Example 5 | Working Example 6 |
|---|---|---|---|---|---|---|---|---|
| Fiber configuration | Single-layer resin | | PLA | PLA | PLA | PLA | PLA | PLA |
| | Composite fiber | Core resin | — | — | — | — | — | — |
| | | Sheath resin | — | — | — | — | — | — |
| | | Core/sheath ratio (mass ratio) | — | — | — | — | — | — |
| Spinning step | Starting material hopper | | N2 purge | N2 purge | N2 purge | N2 purge | N2 purge | Dry air |
| | Extrusion temperature | °C. | 230 | 250 | 230 | 230 | 230 | 230 |
| | Spinneret temperature | °C. | 230 | 250 | 230 | 230 | 230 | 230 |
| | Number of holes | holes | 24 | 350 | 24 | 24 | 24 | 24 |
| | Hole diameter | mm | 0.4 | 0.4 | 0.4 | 0.4 | 0.4 | 0.4 |
| | Take-up velocity | m/min | 500 | 1000 | 500 | 500 | 500 | 500 |
| Drawing step | Wind-off velocity | m/min | 38.5 | 38.5 | 38.5 | 38.5 | 38.5 | 38.5 |
| | Drawing bath | Type | Water bath | Water bath | Water bath | Water bath | Water bath | Water bath |
| | | Temp. (°C.) | 70 | 70 | 70 | 70 | 70 | 70 |
| | | Drawing ratio | 2.48 | 2.48 | 2.48 | 2.48 | 2.48 | 2.48 |
| | Heat treatment bath | Type | Steam | Steam | Steam | Steam | Steam | Steam |
| | | Temp. (°C.) | 100 | 100 | 100 | 100 | 100 | 100 |
| | Total drawing ratio | | 2.60 | 2.60 | 2.60 | 2.60 | 2.60 | 2.60 |
| Degradable fiber | Fineness | de | 1.5 | 1.5 | 1.5 | 1.5 | 1.5 | 1.5 |
| | Fiber length | mm | 6 | 6 | 6 | 4 | 10 | 6 |
| | Use of oiling agent | | Yes | Yes | No | Yes | Yes | Yes |
| | Oligomer component content | Mass % | 0.3 | 0.2 | 0.3 | 0.3 | 0.3 | 0.3 |
| | Birefringence | | 0.07 | 0.07 | 0.07 | 0.07 | 0.07 | 0.07 |
| | Dispersibility of degradable fiber | | A | A | A | A | A | A |
| | Proppant settlement inhibiting effect | | A | A | A | A | A | A |

| | | | Working Example 7 | Working Example 8 | Working Example 9 | Working Example 10 | Working Example 11 |
|---|---|---|---|---|---|---|---|
| Fiber configuration | Single-layer resin | | PLA | PGA | — | — | — |
| | Composite fiber | Core resin | — | — | PGA | PGA | PGA |
| | | Sheath resin | — | — | PLA | PLA | PLA |
| | | Core/sheath ratio (mass ratio) | — | — | 70/30 | 50/50 | 20/80 |
| Spinning step | Starting material hopper | | N2 purge | N2 purge | Dry air | Dry air | Dry air |
| | Extrusion temperature | °C. | 230 | 250 | 250 | 250 | 250 |
| | Spinneret temperature | °C. | 230 | 250 | 250 | 250 | 250 |
| | Number of holes | holes | 24 | 24 | 36 | 36 | 36 |
| | Hole diameter | mm | 0.4 | 0.4 | 0.25 | 0.25 | 0.25 |
| | Take-up velocity | m/min | 500 | 500 | 1000 | 1000 | 1000 |
| Drawing step | Wind-off velocity | m/min | 55 | 38.5 | 38.5 | 38.5 | 38.5 |
| | Drawing bath | Type | Water bath | Water bath | Water bath | Water bath | Water bath |
| | | Temp. (°C.) | 70 | 65 | 65 | 65 | 65 |
| | | Drawing ratio | 1.73 | 2.48 | 2.48 | 2.48 | 2.48 |
| | Heat treatment bath | Type | Hot water | Steam | Steam | Steam | Steam |
| | | Temp. (°C.) | 80 | 100 | 100 | 100 | 100 |
| | Total drawing ratio | | 1.82 | 4.50 | 2.60 | 2.60 | 2.60 |
| Degradable fiber | Fineness | de | 1.5 | 1.5 | 1.8 | 1.8 | 1.8 |
| | Fiber length | mm | 6 | 6 | 6 | 6 | 6 |
| | Use of oiling agent | | Yes | Yes | Yes | Yes | Yes |
| | Oligomer component content | Mass % | 0.3 | 0.2 | 0.5 | 0.4 | 0.3 |

TABLE 1-1-continued

|  |  | | | | | |
|---|---|---|---|---|---|---|
| Birefringence | 0.05 | 0.09 | 0.08 | 0.08 | 0.08 |
| Dispersibility of degradable fiber | A | A | B | A | A |
| Proppant settlement inhibiting effect | A | A | A | A | A |

TABLE 1-2

| | | | Working Example 12 | Working Example 13 | Working Example 14 | Working Example 15 | Working Example 16 | Working Example 17 | Working Example 18 |
|---|---|---|---|---|---|---|---|---|---|
| Fiber configuration | Single-layer resin | | — | — | PBAT | PBS | PBSA | PGA/PLA 80/20 | PGA/PLA 20/80 |
| | Composite fiber | Core resin | PGA | PGA | — | — | — | — | — |
| | | Sheath resin | PLA | PLA | — | — | — | — | — |
| | | Core/sheath ratio (mass ratio) | 50/50 | 50/50 | — | — | — | — | — |
| Spinning step | Starting material hopper | | Dry air | Dry air | N2 purge | N2 purge | N2 purge | N2 purge | N2 purge |
| | Extrusion temperature | °C. | 260 | 260 | 150 | 150 | 150 | 250 | 250 |
| | Spinneret temperature | °C. | 260 | 260 | 150 | 150 | 150 | 250 | 250 |
| | Number of holes | holes | 350 | 350 | 24 | 24 | 24 | 24 | 24 |
| | Hole diameter | mm | 0.4 | 0.4 | 0.4 | 0.4 | 0.4 | 0.4 | 0.4 |
| | Take-up velocity | m/min | 1000 | 1000 | 500 | 500 | 500 | 500 | 500 |
| Drawing step | Wind-off velocity | m/min | 38.5 | 38.5 | 38.5 | 38.5 | 38.5 | 38.5 | 38.5 |
| | Drawing bath | Type | Water bath | Water bath | Water bath | Water bath | Water bath | Water bath | Water bath |
| | | Temp. (°C.) | 65 | 65 | 25 | 25 | 25 | 65 | 65 |
| | | Drawing ratio | 2.48 | 2.48 | 2.48 | 2.48 | 2.48 | 2.48 | 2.48 |
| | Heat treatment bath | Type | Steam | Steam | Hot water | Hot water | Hot water | Steam | Steam |
| | | Temp. (°C.) | 100 | 100 | 80 | 80 | 80 | 100 | 100 |
| | Total drawing ratio | | 2.60 | 4.50 | 2.60 | 2.60 | 2.60 | 2.60 | 2.60 |
| Degradable fiber | Fineness | de | 1.1 | 4.0 | 1.8 | 1.8 | 1.8 | 1.8 | 1.8 |
| | Fiber length | mm | 6 | 6 | 6 | 6 | 6 | 6 | 6 |
| | Use of oiling agent | | Yes | Yes | Yes | Yes | Yes | Yes | Yes |
| | Oligomer component content | Mass % | 0.2 | <0.1 | 0.3 | 0.3 | 0.3 | 0.3 | 0.3 |
| | Birefringence | | 0.09 | 0.08 | 0.04 | 0.04 | 0.03 | 0.07 | 0.07 |
| | Dispersibility of degradable fiber | | B | A | B | B | B | B | B |
| | Proppant settlement inhibiting effect | | A | A | A | A | A | A | A |

| | | | Comparative Example 1 | Comparative Example 2 | Comparative Example 3 | Comparative Example 4 |
|---|---|---|---|---|---|---|
| Fiber configuration | Single-layer resin | | PLA | — | PLA | PLA |
| | Composite fiber | Core resin | — | PGA | — | — |
| | | Sheath resin | — | PLA | — | — |
| | | Core/sheath ratio (mass ratio) | — | 70/30 | — | — |
| Spinning step | Starting material hopper | | — | — | N2 purge | N2 purge |
| | Extrusion temperature | °C. | 230 | 250 | 230 | 230 |
| | Spinneret temperature | °C. | 230 | 250 | 230 | 230 |
| | Number of holes | holes | 24 | 36 | 24 | 24 |
| | Hole diameter | mm | 0.4 | 0.25 | 0.4 | 0.4 |
| | Take-up velocity | m/min | 500 | 1000 | 500 | 500 |
| Drawing step | Wind-off velocity | m/min | 38.5 | 38.5 | 55.0 | 55.0 |
| | Drawing bath | Type | Water bath | Water bath | Water bath | Water bath |
| | | Temp. (°C.) | 70 | 65 | 70 | 70 |
| | | Drawing ratio | 2.48 | 2.48 | 1.20 | 1.73 |
| | Heat treatment bath | Type | Steam | Steam | Steam | Dry heat |
| | | Temp. (°C.) | 100 | 100 | 100 | 120 |

TABLE 1-2-continued

| | | | | | | |
|---|---|---|---|---|---|---|
| | Total drawing ratio | | 2.60 | 2.60 | 1.82 | 1.82 |
| Degradable fiber | Fineness | de | 1.5 | 1.8 | 1.5 | 1.5 |
| | Fiber length | mm | 6 | 6 | 6 | 6 |
| | Use of oiling agent | | Yes | Yes | Yes | Yes |
| | Oligomer component content | Mass % | 3.8 | 6.8 | 0.3 | 0.3 |
| | Birefringence | | 0.06 | 0.06 | 0.018 | 0.018 |
| | Dispersibility of degradable fiber | | E | E | C | D |
| | Proppant settlement inhibiting effect | | D | D | C | D |

From Table 1 (Table 1-1 and Table 1-2|) it was understood that for the degradable fibers for use in well treatment fluid of Working Examples 1 to 18, which are fibers formed from resin that degrades in treatment fluid for hydrocarbon resource recovery in which the oligomer component content in the resin that forms the outer surface of the fiber is not greater than 1 mass % and the birefringence of the fiber is not less than 0.02, the evaluation of dispersibility of the degradable fiber is A (excellent) or B (good), and the evaluation of proppant settlement inhibiting effect is A (excellent). Therefore, it was ascertained that the degradable fibers for use in well treatment fluid of Working Examples 1 to 18 are suitable for use in a well treatment method that uses a well treatment fluid containing those degradable fibers for use in well treatment fluid and a proppant.

In contrast, it was understood that for the degradable fibers of Comparative Examples 1 and 2, which are fibers formed from resin that degrades in treatment fluid for hydrocarbon resource recovery, in which the oligomer component content in the resin that forms the outer surface of the fiber is greater than 1 mass %, the evaluation of dispersibility of the degradable fiber is E (very poor), and the evaluation of proppant settlement inhibiting effect is D (poor). Furthermore, for the degradable fibers of Comparative Examples 3 and 4, in which the birefringence of the fiber is less than 0.02, the evaluation of dispersibility of the degradable fiber is C (fair) or D (poor), and the evaluation of proppant settlement inhibiting effect is C (fair) or D (poor). Therefore, none of the degradable fibers of the comparative examples was suitable as a degradable fiber for use in well treatment fluid.

INDUSTRIAL APPLICABILITY

In the first aspect, the present invention can provide a degradable fiber for use in well treatment fluid, in which, due to being a degradable fiber for use in well treatment fluid formed from a resin that degrades in a treatment fluid for hydrocarbon resource recovery wherein an oligomer component content of a resin forming an outer surface of the fiber is not greater than 1 mass % and a birefringence of the fiber is not less than 0.02, the proppant settlement inhibiting effect is excellent, and, due to having excellent hydrolyzability and biodegradability, the well stimulation effect of fracturing or the like can be improved. Therefore, its industrial applicability is high.

Furthermore, in another aspect, the present invention can provide a method for manufacturing the aforementioned degradable fiber for use in well treatment fluid, comprising a spinning step and a drawing step, which can easily manufacture a degradable fiber for use in well treatment fluid which, due to the oligomer component content of a resin that forms an outer surface of an undrawn yarn obtained in the spinning step being not greater than 1 mass % and due to a birefringence of a drawn yarn before heat treatment in the drawing step being not less than 0.02, has an excellent proppant settlement inhibiting effect, and, due to having hydrolyzability and biodegradability, can improve the well stimulation effect of fracturing or the like. Therefore, its industrial applicability is high.

Furthermore, in yet another aspect, the present invention can provide a well treatment method using a well treatment fluid containing the aforementioned degradable fiber for use in well treatment fluid and a proppant, in which the proppant in a viscous carrier fluid is prevented from settling while the well treatment fluid containing the proppant is being transported to the location where well stimulation such as fracturing is performed, and after well stimulation such as fracturing, the degradable fiber is degraded and removed. Therefore, its industrial applicability is high.

The invention claimed is:

1. A degradable fiber for use in well treatment fluid, formed from a resin that degrades in a treatment fluid for hydrocarbon resource recovery,
    the degradable fiber being a composite fiber having a core-sheath structure,
    the resin being at least one resin selected from aliphatic polyesters each formed from a hydroxycarboxylic acid,
    a resin that forms an outer surface of the fiber containing an oligomer component of the at least one resin selected from the aliphatic polyesters,
    the oligomer component being a low polymer in which a number of repeating units is from 1 to 50,
    an oligomer component content being not greater than 1 mass %, and a birefringence of the fiber being not less than 0.02.

2. The degradable fiber for use in well treatment fluid according to claim 1, wherein the fiber is dispersed in a single-fiber state in a treatment fluid for hydrocarbon resource recovery.

3. The degradable fiber for use in well treatment fluid according to claim 1, wherein a fineness is from 0.1 to 20 denier, and a fiber length is from 0.3 to 100 mm.

4. The degradable fiber for use in well treatment fluid according to claim 1, wherein the fiber is a composite fiber.

5. The degradable fiber for use in well treatment fluid according to claim 3, wherein the fiber is a composite fiber.

6. A method for manufacturing a degradable fiber for use in well treatment fluid in which the fiber is formed from a resin that degrades in treatment fluid for hydrocarbon resource recovery, the degradable fiber being a composite fiber having a core-sheath structure, the resin being at least one resin selected from aliphatic polyesters each formed from a hydroxycarboxylic acid, a resin that forms an outer surface of the fiber containing an oligomer component of the at least one resin selected from the aliphatic polyesters, the oligomer component being a low polymer in which a number of repeating units is from 1 to 50, an oligomer component content being not greater than 1 mass %, and a birefringence of the fiber is not less than 0.02, comprising a spinning step and a drawing step, the oligomer component content of a resin that forms an outer surface of an undrawn yarn obtained in the spinning step being not greater than 1 mass %, and a birefringence of a drawn yarn before heat treatment in the drawing step being not less than 0.02.

7. A well treatment method using a well treatment fluid containing a degradable fiber for use in well treatment fluid and a proppant, the fiber being formed from a resin that degrades in treatment fluid for hydrocarbon resource recovery, the degradable fiber being a composite fiber having a core-sheath structure, the resin being at least one resin selected from aliphatic polyesters each formed from a hydroxycarboxylic acid, a resin that forms an outer surface of the fiber containing an oligomer component of the at least one resin selected from the aliphatic polyesters, the oligomer component being a low polymer in which a number of repeating units is from 1 to 50, an oligomer component content being not greater than 1 mass %, and a birefringence of the fiber being not less than 0.02.

8. The well treatment method according to claim 7, using a well treatment fluid containing a degradable fiber for use in well treatment fluid and a proppant, the degradable fiber for use in well treatment fluid being dispersed in a single-fiber state in a treatment fluid for hydrocarbon resource recovery.

9. The well treatment method according to claim 7, using a well treatment fluid containing a degradable fiber for use in well treatment fluid and a proppant, the degradable fiber for use in well treatment fluid having a fineness of 0.1 to 20 denier and a fiber length of 0.3 to 100 mm.

10. The well treatment method according to claim 7, using a well treatment fluid containing a degradable fiber for use in well treatment fluid and a proppant, the degradable fiber for use in well treatment fluid being a composite fiber.

11. The well treatment method according to claim 9, using a well treatment fluid containing a degradable fiber for use in well treatment fluid and a proppant, the degradable fiber for use in well treatment fluid being a composite fiber.

* * * * *